United States Patent
Vermeulen et al.

(10) Patent No.: US 12,068,637 B2
(45) Date of Patent: Aug. 20, 2024

(54) ROTOR WITH A BANDAGE ARRANGEMENT FOR AN ELECTRICAL MACHINE

(71) Applicant: Rolls-Royce Deutschland Ltd & Co KG, Blankenfelde-Mahlow (DE)

(72) Inventors: Tobias Vermeulen, Munich (DE); Johannes Gabriel Bauer, Neuried (DE); Daniel Merz, Munich (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 401 days.

(21) Appl. No.: 17/426,630

(22) PCT Filed: Jan. 21, 2020

(86) PCT No.: PCT/EP2020/051414
§ 371 (c)(1),
(2) Date: Jul. 28, 2021

(87) PCT Pub. No.: WO2020/156888
PCT Pub. Date: Aug. 6, 2020

(65) Prior Publication Data
US 2022/0123613 A1     Apr. 21, 2022

(30) Foreign Application Priority Data
Jan. 29, 2019 (DE) ............... 10 2019 201 056.3

(51) Int. Cl.
*H02K 1/278* (2022.01)
*H02K 1/28* (2006.01)

(52) U.S. Cl.
CPC ............ *H02K 1/278* (2013.01); *H02K 1/28* (2013.01)

(58) Field of Classification Search
CPC ................... H02K 1/278; H02K 1/28
See application file for complete search history.

(56) References Cited

U.S. PATENT DOCUMENTS

| 2013/0221787 A1* | 8/2013 | Kritharidou | H02K 1/27 310/156.16 |
| 2017/0054334 A1* | 2/2017 | Binder | A47L 9/0072 |
| 2020/0127513 A1* | 4/2020 | Jastrzembski | H02K 1/278 |

FOREIGN PATENT DOCUMENTS

| CN | 207835192 U | 9/2018 | |
| DE | 102004026453 A1 * | 12/2004 | H02K 1/146 |

(Continued)

OTHER PUBLICATIONS

German Search Report for German Application No. 10 2019 201 056.3 dated Oct. 4, 2019.

(Continued)

*Primary Examiner* — Tulsidas C Patel
*Assistant Examiner* — Joshua Kiel M Rodriguez
(74) *Attorney, Agent, or Firm* — Lempia Summerfield Katz LLC

(57) ABSTRACT

A bandage for a rotor of an electrical machine that may be used in an electrical drive system of an aircraft is provided. The bandage, which serves to fix permanent magnets to the rotor, includes two rings, which are coaxial circular ring-like components, that are connected together by axial webs. The permanent magnets each have axial grooves on a surface of the respective permanent magnet facing the stator. The bandage is arranged on the rotor such that the permanent magnets lie between the rings, and the axial webs are positioned in the axial grooves. Since a thickness of the axial webs corresponds to a depth of the axial grooves, the magnet surfaces and the surface of the bandage are flush with one another, such that the bandage requires no additional space in an air gap.

15 Claims, 9 Drawing Sheets

(56) References Cited

FOREIGN PATENT DOCUMENTS

| DE | 102013107526 A1 | | 1/2015 | | |
|----|-----------------|---|--------|---|---|
| DE | 102014202570 A1 | | 8/2015 | | |
| EP | 1748533 A1 | | 1/2007 | | |
| EP | 3208912 A1 | | 8/2017 | | |
| KR | 2007-0113727 A | * | 11/2007 | ............... | H02K 1/27 |
| WO | 2011108737 A1 | | 9/2011 | | |
| WO | 2019110426 A1 | | 6/2019 | | |

OTHER PUBLICATIONS

International Search Report and the Written Opinion for International Patent Application PCT/EP2020/051414 mailed Apr. 2, 2020.

* cited by examiner

ROTOR WITH A BANDAGE ARRANGEMENT FOR AN ELECTRICAL MACHINE

This application is the National Stage of International Application No. PCT/EP2020/051414, filed Jan. 21, 2020, which claims the benefit of German Patent Application No. DE 10 2019 201 056.3, filed Jan. 29, 2019. The entire contents of these documents are hereby incorporated herein by reference.

BACKGROUND

The present embodiments relate to a rotor for an electrical machine, and, more specifically, to the fastening of magnetic devices to the rotor.

As an alternative to the usual internal combustion machines, concepts based on electric drive systems are being tested and used for propelling aircraft (e.g., airplanes or helicopters) or also for electrically-powered watercraft, etc. An electric or hybrid-electric drive system of this type typically has one or a plurality of electrical machines that, depending on the specific application in the drive system, may be configured as generators and/or as electric motors.

The drive concept that may be used for such mobile applications is based, for example, on direct drive in which the electrical machine is directly connected (e.g., without gear mechanism) to a propulsion device to be driven (e.g., a propeller). In direct drive systems, extraordinarily high torque densities are to be provided to be able to generate the power levels necessary for propulsion. For this, the air gap formed between the rotor and stator of the electric machine is, for example, to be as small as possible. The same applies to other drive concepts (e.g., typically the aim is to achieve as narrow an air gap as possible between the rotor and stator).

In order, however, to create electrical machines with high torque density or also with high power density, in some cases extreme demands are imposed on the components of the electrical machine. For example, it is to be assumed that because of rotation of the rotor during operation of the machine, high centrifugal forces acting in the radial direction may act on the surface magnets positioned on the rotor surface. These are therefore to be retained on the rotor with corresponding complexity or by a bandage, which negatively affects the dimensioning of the machine and the air gap.

Extremely high torque levels are to be transmitted from the permanent magnets to the rotor hub or vice versa. It is therefore to be provided that the magnets are also adequately attached to the rotor in the tangential direction, or in the circumferential direction, of the rotor, respectively. Additionally, frictional and/or positive connections of the magnets on the rotor are used, for example. The friction-fitting connection may, for example, be supported by the use of the bandage.

A bandage of this type thus compensates for the centrifugal forces acting in the radial direction and prevents the permanent magnets from being separated from the rotor or from the rotor main body. The bandage presses the permanent magnets toward the main body, which creates a surface pressure at all contact points between the respective magnet and the surface of the rotor main body. The contact pressure per unit area herein is to be such that the torque generated due to the electromagnetic interaction between the permanent magnets and the energized stator windings of the stator of the electrical machine is completely transmitted from the permanent magnets to the rotor main body, so that the permanent magnets with respect to the rotor main body are also not displaced in the tangential direction. In other words, the contact pressure per unit area is to be sufficiently high that forces acting in the tangential direction are also compensated for. Further, the surface pressure is to be sufficiently large in order to compensate not only for the radial and tangential forces, but in some cases, also for the magnetic pull.

The bandage thus generally fulfils several functions, specifically the prevention of radial movement of the permanent magnets due to centrifugal force, the enabling of a transmission of the torque to the main body, and possibly the compensation of the magnetic pull.

Increased mechanical requirements are set for the bandage on account of the multiple stresses. These requirements result in a corresponding choice of material connected with an increased weight, and a certain necessary minimum wall thickness or thickness of the bandage (e.g., the extent of the bandage in the radial direction). Since the bandage is arranged in the air gap between the permanent magnets and the stator teeth, and the thickness of the air gap has a substantial effect on the power density of the machine, the aim is to keep the wall thickness of the bandage as small as possible, since with small thickness, the air gap may also be kept correspondingly thin. A corresponding embodiment of a suitable bandage may, for example, be tape based on a fibre-composite material that is wrapped directly onto the rotor or magnets. Alternatively, the bandage may also be a precision-made tube that corresponds to the axial length of the rotor or the corresponding extent of the magnet, and that consists, for example of titanium, certain alloys, or fibre-composite materials, and may be pressed onto the rotor so that the magnets remain in place. In order to further reduce the forces to be compensated by the bandage, PCT/EP2018/083047, for example, proposes a method that at least substantially restricts the tangential force acting on the magnets as a result of the torque, and thus finally allows a reduction in thickness of the bandage.

The bandage is to be positioned between the rotor and stator, so the thickness of the bandage is to be taken into account in the dimensioning of the air gap. Consequently, because of the presence of the bandage, the air gap is to be configured larger than would be necessary without the bandage.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a possibility for reducing an air gap of an electrical machine despite the presence of a bandage is provided.

The rotor for the electrical machine has at least one permanent magnet group and a bandage arrangement. Each permanent magnet group includes at least one permanent magnet. The bandage arrangement has at least one retaining region for fixing each permanent magnet of a respective permanent magnet group to a surface of the rotor that faces a stator of the machine in the state installed in the machine. The bandage arrangement is arranged such that each of the permanent magnets of the respective permanent magnet group is partly situated, in a radial direction, between a respective retaining region of the bandage arrangement and the surface. Each of the permanent magnets of the respective permanent magnet group has a groove in a groove surface region of a respective outer magnet surface facing away from the surface of the rotor and facing towards the bandage arrangement. The bandage arrangement is dimensioned and configured, and arranged with respect to each permanent magnet of the respective permanent magnet group, such that at least the respective retaining region of the bandage arrangement is positioned in a respective groove of a respective permanent magnet of the respective permanent magnet group.

The outer magnet surface that faces the stator in the state with the rotor installed in the machine includes the groove surface region and a free surface region. The respective groove is formed in the magnet surface in the groove surface region as a radial recess opposite the free surface region, so that the respective retaining region of the bandage arrangement may be positioned in the groove. The arrangement described provides, for example, that the bandage arrangement lies only in the groove surface region of the respective magnet between the magnet and the stator, and not in or on the free surface region of the magnet. Since, however, the bandage arrangement lies in the groove made in the radial direction in the magnet and not on the magnet surface, the air gap between the rotor and stator may be reduced and hence the power density increased.

The surface of the bandage arrangement facing away from the rotor, at least in the retaining regions with free surface regions lying outside the respective groove surface region of the outer magnet surface of the respective permanent magnet, forms a substantially smooth cylinder surface (e.g., the free surface regions and the surface of the bandage arrangement facing away from the rotor are flush with one another). The cylinder surface therefore partly includes the surface of the bandage arrangement and partly the free surface regions of the permanent magnets at which the magnets are not covered by the bandage arrangement. The bandage arrangement has, for example, a thickness in the respective retaining region positioned in a respective groove that corresponds to the depth of the respective groove (e.g., the extent of the groove in the radial direction in which the respective retaining region is positioned), so that the bandage arrangement and the outer magnet surfaces form a substantially smooth surface or are flush with one another. This provides that the bandage does not extend beyond the outer surfaces of the magnet, and consequently takes up no additional space in the air gap.

In a first embodiment, each permanent magnet group has a plurality of permanent magnets, where the permanent magnets of the respective permanent magnet group are positioned one behind the other viewed in the tangential direction (e.g., along the circumference of the rotor), and hence adjacent to one another on the surface of the rotor, so as to form a possibly interrupted, substantially circular, ring-like magnet ring.

The grooves of the permanent magnets of the respective permanent magnet group or magnet ring are configured in the respective outer magnet surface such that the grooves of adjacent permanent magnets of the respective permanent magnet group adjoin one another, so that the entirety of the mutually adjoining grooves forms a substantially circular ring-like groove, running in the tangential direction, of the respective permanent magnet group.

The magnet ring or rings may be interrupted (e.g., two adjacent permanent magnets of the respective magnet ring do not abut one another directly, but there is an empty or filled intermediate space between these adjacent magnets). The term "peripheral groove" also applies in the case of an interrupted magnet ring even if no magnet and hence no respective groove is present in such intermediate space. Accordingly, the term "mutually adjoin" in connection with the individual grooves of individual magnets includes the situation in which the adjacent magnets do not abut one another directly. In this situation, the expression that the grooves adjoin one another provides that the grooves of the adjacent magnets may not abut one another directly.

For a respective permanent magnet group, the bandage arrangement has, as a retaining region, a bandage component that is configured, for example, as a substantially flat circular ring. A respective bandage component of the bandage arrangement is positioned in a respective peripheral groove of a respective permanent magnet group.

For the case that a number of permanent magnet groups are provided, the respective permanent magnets for each group are typically arranged on the surface of the rotor such that the resulting magnet rings are coaxial to one another. The bandage arrangement then includes a number of bandage components that corresponds to the number of permanent magnet groups. The bandage components are each formed substantially as a circular ring and lie in one of the peripheral grooves as described above. The individual bandage components need not necessarily be connected together but may be formed as separate components or rings (e.g., the bandage arrangement may be composed of a number of components not connected together).

In a second embodiment, the bandage arrangement includes a ring group and a web group. The ring group includes at least a first ring and a second ring. Rings of the ring group may be arranged coaxially to one another and spaced apart from one another, or behind one another in the axial direction, so that a ring intermediate space is situated between each two mutually adjacent rings of the ring group. The web group includes a plurality of webs. Each web of the web group runs between two rings of the ring group that are adjacent to one another in the axial direction. A number of webs of the web group run between each two adjacent rings of the ring group, so that in each case two adjacent rings of the ring group are connected together via a number of webs of the web group.

The bandage arrangement is arranged on the rotor such that one of the permanent magnet groups is situated in each case between two mutually adjacent rings of the ring group (e.g., the respective permanent magnet group lies in the corresponding intermediate space). At least some of the webs of the web group and/or the rings of the ring group each form a retaining region of the bandage arrangement and are accordingly positioned in a respective groove of a respective permanent magnet of the respective permanent magnet group. Thus, for example, two permanent magnet groups may be provided. For both groups, the magnets are arranged one behind the other viewed in the tangential direction (e.g., along the circumference of the rotor). Viewed in the axial direction, the groups are spaced apart from one another. In this case, the bandage arrangement includes three rings. The axially middle ring is arranged between the permanent magnet groups. Viewed from the axially middle ring, webs extend in both axial directions to the other two rings.

For each permanent magnet, in this embodiment, the respective groove runs between the two axial ends of the respective permanent magnet. In the extreme case, this provides that the grooves run in the axial direction. In one embodiment, the grooves run at an angle a of $0° < a < 90°$ to the axial direction, where the angle a in this embodiment cannot be 90° since this corresponds to the above-mentioned embodiment in which the grooves would run in the tangential direction.

The respective groove is positioned, for example, such that the respective groove lies on a magnetic pole of the respective permanent magnet and not between two poles. Thus, for the same torque, the normal force is reduced by around 10%, which counters the structural design.

The number of webs that run between two adjacent rings of the ring group are arranged one behind the other viewed in the tangential direction, and hence distributed around the periphery of the bandage, so that there is an empty web intermediate space between each two such adjacent webs. The webs of the web group and/or the rings of the ring group that form a retaining region of the bandage arrangement, and are positioned accordingly in a respective groove, are dimensioned and the bandage arrangement is arranged with respect to the respective permanent magnet group such that a free surface region of the outer magnet surface lying outside the groove surface region is positioned in one of the web intermediate spaces, viewed in the radial direction. This provides that no part of the bandage arrangement, but a respective intermediate space, lies, for example, vertically above the free surface region. In the state installed in the electrical machine, this provides that no bandage material is present between the free surface regions of the magnet and the stator.

At least the rings of the ring group on the outside viewed in the axial direction (e.g., each ring of the ring group) has at least one radially inner and one radially outer partial ring portion. For the rings of the ring group that consist of a radially inner partial ring portion and the radially outer partial ring portion, in each case, the radially inner partial ring portion is arranged radially inside the radially outer partial ring portion. The partial rings may lie against one another and thus finally form an integral component (e.g., the respective ring of the ring group). Further, for these rings, the thickness of one of the respective partial ring portions corresponds to the thickness of the webs, while the total thickness of the respective ring is greater than the thickness of the webs.

For the sake of clarity, the term "comprise" also includes the situation in which the rings concerned are integral (e.g., the respective inner and outer partial ring portions form an integral unitary component). This also covers the situation in which the respective rings are composed of two separate partial rings (e.g., with an inner partial ring glued to the outer partial ring).

In a simple configuration of the bandage as a punched sheet or similar, in each case, the "outer partial ring" may be an integral part of the flat sheet itself, so that the thickness of the webs and the thickness of the outer partial rings effectively correspond automatically. The respective "inner partial ring" may then, for example, be a further ring that is attached to the outer partial ring and thus extends away from the sheet in the radial direction corresponding to a radial thickness of the respective "inner partial ring".

The webs of the web group may form an integral component with the rings of the ring group. For production, for example, a correspondingly thin sheet may be used from which the parts may be punched or cut so as to form the webs and rings.

The webs of the web group and the rings of the ring group may each constitute separate components, where the bandage arrangement is constructed by corresponding joining of the individual webs and individual rings. The webs may, for example, be formed such that the webs are bent in the state not yet installed in the bandage arrangement, and substantially flat in the state installed in the bandage arrangement. This provides that in installed state, an even pressure is exerted on the magnets.

A corresponding bandage arrangement for fixing a permanent magnet to a rotor of an electrical machine thus includes a ring group and a web group. The ring group includes at least a first ring and a second ring. The rings of the ring group may be arranged coaxially to one another and spaced apart from one another or behind one another in the axial direction, so that there is a ring intermediate space between each two mutually adjacent rings of the ring group. The web group includes a plurality of webs, where each web of the web group runs between two rings of the ring group that are adjacent to one another in the axial direction. A number of webs of the web group run between each two adjacent rings of the ring group, so that in each case, two adjacent rings of the ring group are connected together via several webs of the web group. In one embodiment, the number of webs that run between two adjacent rings of the ring group are arranged one behind the other viewed in the tangential direction and hence distributed around the periphery of the bandage, so that there is an empty web intermediate space between each two such adjacent webs.

Each of at least the rings of the ring group on the outside viewed in the axial direction (e.g., each ring of the ring group) has at least one radially inner partial ring portion and one radially outer partial ring portion. For the rings of the ring group that consist of a radially inner partial ring portion and a radially outer partial ring portion, the respective radially inner partial ring portion is arranged radially inside the radially outer partial ring portion. The partial rings adjoin one another and thus may finally form an integral component (e.g., the respective ring of the ring group). The thickness of one of the respective partial ring portions corresponds to the thickness of the webs, and the total thickness of the respective ring is greater than the thickness of the webs.

An electrical machine that may be used, for example, in a drive system of an aircraft includes the rotor described with the bandage arrangement also described. This allows the creation of an electrical machine with minimal air gap.

Further advantages and embodiments may be found in the drawings and the corresponding description.

The invention and exemplary embodiments will be explained in more detail below with reference to drawings. There, the same components are identified by the same reference signs in various figures. It is therefore possible that, when a second figure is being described, no detailed explanation will be given of a specific reference sign that has already been explained in relation to another, first figure. In such a case, it may be assumed for the embodiment of the second figure that, even without detailed explanation in relation to the second figure, the component identified there by this reference sign has the same properties and functionalities as explained in relation to the first figure. Further, for the sake of clarity, in some cases, not all the reference signs are shown in all of the figures, but only the reference signs to which reference is made in the description of the respective figure.

DETAILED DESCRIPTION

It should be noted that terms such as "axial", "radial", "tangential", etc. relate to a shaft or axis used in the respective figure or in the example described in each case. In other words, the directions axial, radial, tangential at all times relate to an axis of rotation of the rotor. "Axial" herein describes a direction parallel to the axis of rotation, "radial" describes a direction orthogonal to the axis of rotation, toward or away from the axis of rotation, and "tangential" is a movement or direction, respectively, orthogonal to the axis and orthogonal to the radial direction, which is directed at a constant radial spacing from the axis of rotation and with a constant axial position in a circle around the axis of rotation.

Further, the terms "axial", "radial", or "tangential", respectively, in the context of an area (e.g., a surface), provide that the normal vector of the respective axial, radial, or tangential surface is oriented in the axial, radial, or tangential direction, whereby the orientation of the respective area in space is unequivocally described.

In connection with components (e.g., rings or webs), the term "adjacent" is intended to express the fact that, in the case of "adjacent components", there is, for example, no further such component between these two components but at most an empty intermediate space.

The expression "coaxial components" (e.g., coaxial rings) may provide that components have same normal vectors, for which, therefore, the planes defined by the coaxial components are parallel to one another. Further, the expression provides that middle points of coaxial components may lie on a same axis of rotation or symmetry, but in some cases, may lie on this axis at different axial positions, and the planes thus have a distance >0 from one another. The expression does not necessarily require that coaxial components have a same radius.

Figure 1:
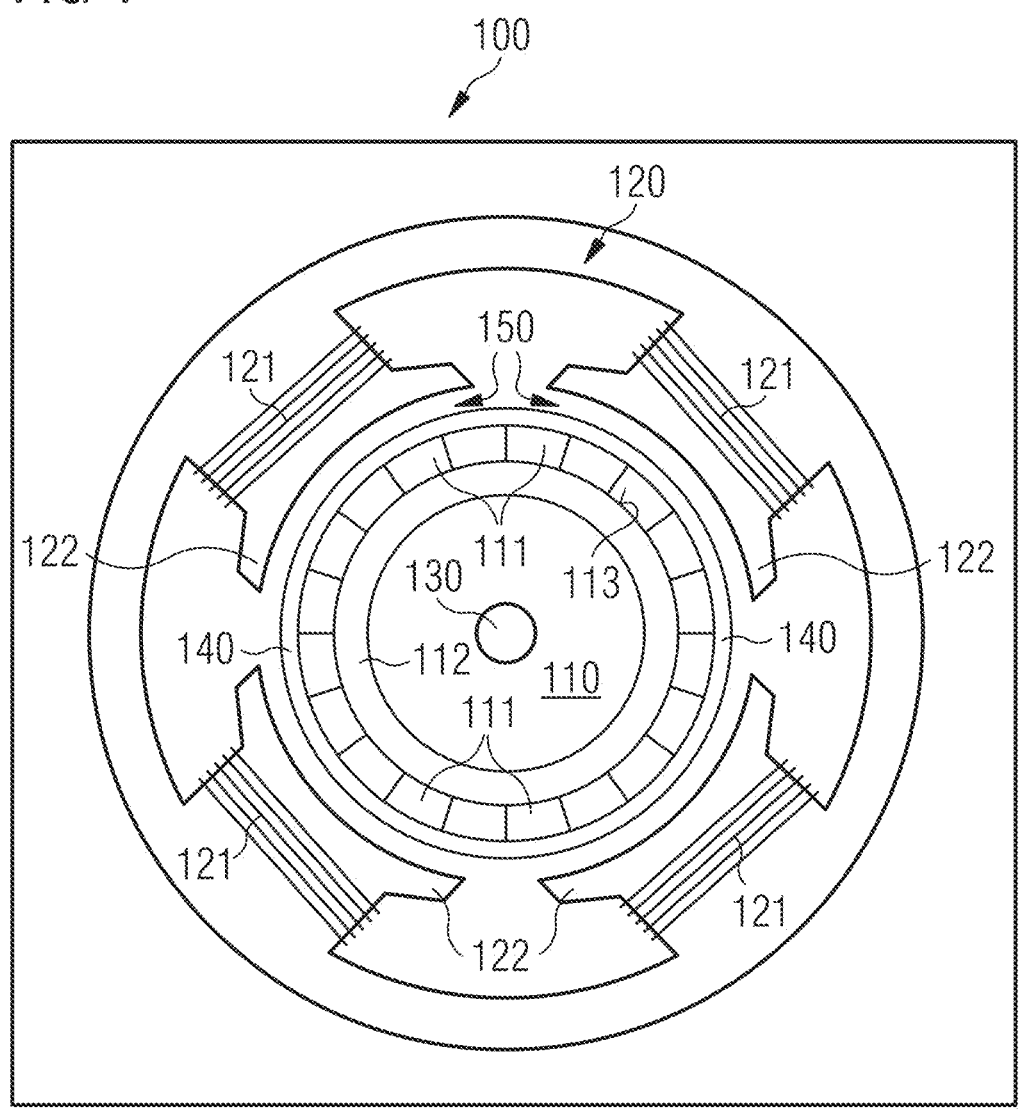
FIG. 1 shows a known electrical machine.

FIG. 1 shows, by way of example, an electrical machine 100 formed as an electric motor, as is known in the prior art. The electrical machine 100, in a similar structure, may also be operated as a generator in principle. Further, the construction of the machine described hereafter is greatly simplified and, for example, does not show some of the details explained in connection with the other figures; rather, this serves only to illustrate the fundamental functional mode of the electric motor. It may be assumed to be known that the various components of the machine may be disposed differently, depending on the design of the electric machine as a generator or as an electric motor and/or as, for example, a radial or axial flow machine with a rotor configured as an internal or external rotor, etc.

The electric motor 100 has a substantially annular stator 120 and a substantially cylindrical rotor 110, formed as an internal rotor. The rotor 110 is arranged within the stator 120 and, in the operating state of the electric motor 100, rotating about an axis of rotation. The rotor 110 or a substantially cylindrical rotor main body 112 of the rotor 110 is connected in a rotationally fixed manner to a shaft 130, so that a rotation of the rotor 110 may be transmitted via the shaft 130 to a component, not illustrated, to be driven (e.g., to a propeller of an aircraft).

The stator 120 has a first magnetic device 121 that may be implemented, for example, as stator windings 121. Each of the windings 121 is formed by an electrical conductor. The conductors 121 have in each case been wound onto a stator tooth 122 of the stator 120 and, in the operating state of the electric motor 100, an electric current flows through the conductors so that magnetic fields are generated. The rotor 110 has a second magnetic device 111 that may, for example, be formed as permanent magnets 111 or as excited or excitable windings. For the sake of clarity, only a few permanent magnets 111, for example, are marked with a reference sign. It is assumed in the text that follows that the second magnetic device 111 is permanent magnets 111. A bandage 140, substantially configured as a hollow cylinder, is arranged externally about the rotor 110 having the permanent magnets 111, so as to provide, as explained at the outset, that the magnets 111 remain fixed to the rotor 110 even during rotation of the rotor 110.

The first magnetic device 121 and the second magnetic device 111 are configured and spaced apart from one another by an air gap 150 such that the first magnetic device 121 and the second magnetic device 111 interact electromagnetically with one another in an operating state of the electric motor 100. This concept, including the conditions for the configuration and precise arrangement of the first magnetic device 121 and the second magnetic device 111 or of the rotor 110 and stator 120, are known per se and therefore will not be explained in more detail below. In order to operate the electric machine 100 as an electric motor, the stator windings 121 are loaded with an electric current by an energy source (not shown). The electric current causes the windings 121 to generate corresponding magnetic fields that come to interact electromagnetically with the magnetic fields of the permanent magnets 111 of the rotor 110. This results in a torque acting on the permanent magnets 111, which, provided that the permanent magnets 111 are connected sufficiently firmly to the rotor main body 112, results in the rotor 110 and, conjointly therewith, the shaft 130 being set in rotation when the components are suitably configured and disposed in relation to one another.

This concept of configuring the electrical machine 100 as an electric motor may be assumed to be known. The corresponding configuration and use of the electric machine 100 as a generator may also be assumed to be known. The two configurations of the electrical machine 100 are not therefore detailed any further below.

Figure 2:
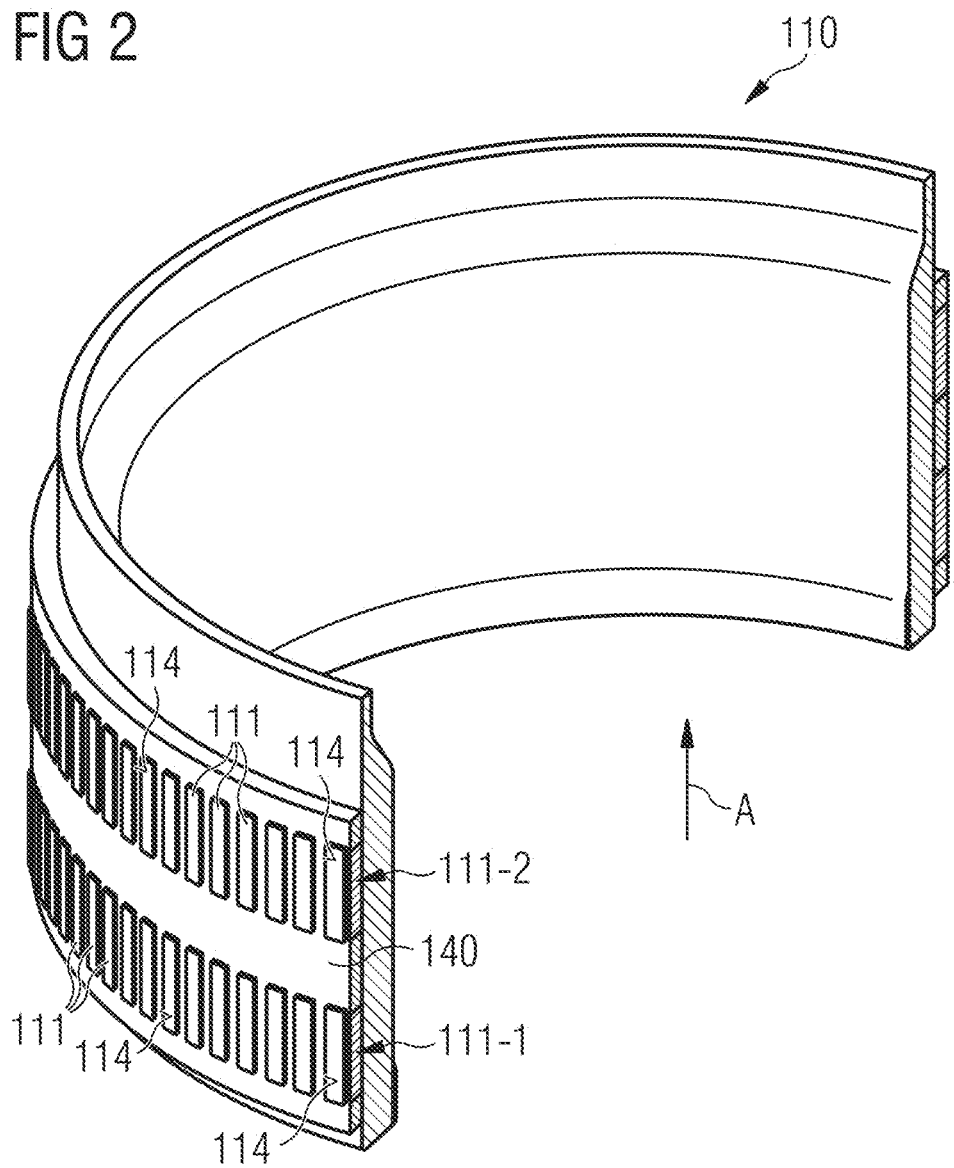
FIG. 2 is a perspective view of a portion of a rotor of an electrical machine with a bandage arrangement in a first embodiment.

FIG. 2 shows a perspective view of a rotor 110, divided in the middle for illustration, with permanent magnets 111 and a bandage arrangement 140 according to a first embodiment for fixing each permanent magnet 111 to a surface of the rotor 110. Further components of the electrical machine 100 are not shown here or in the other following figures. The stator 120 (not shown) is arranged radially outside the rotor 110, so that the bandage arrangement 140 is finally situated between the rotor 110 and the stator 120.

A first plurality of permanent magnets 111 and a second plurality of permanent magnets 111, each forming a first 111-1 or a second 111-2 permanent magnet group respectively, are arranged on an outer surface 113 of the rotor 110 or rotor main body 112 facing the stator 120 in the state fitted in the machine 100 of FIG. 1. The magnets 111 of a respective group 111-1 or 111-2 are arranged one behind the other along a circumference of the rotor 110, so that the magnets 111 of a respective group 111-1 or 111-2 each form a type of circular ring. These two circular rings are coaxial and arranged spaced apart from one another in the axial direction A.

Fundamentally, it is not necessary to provide precisely two groups of permanent magnets. Also, the electrical machine 100 using this rotor 110 may be operated with just one or also with more than two such groups.

As explained initially, during operation of the electrical machine 100 (e.g., with the rotor 110 rotating), the permanent magnets 111 are subjected to radial and tangential forces that are to be compensated in order to provide that the magnets remain in place on the rotor surface 113. This fixing is usually achieved in that the magnets 111, in addition to a corresponding bonding to the rotor main body 112, are pressed onto the surface 113 by the substantially cylindrical bandage 140. Since the bandage 140 is to accordingly be arranged between the magnets 111 and the stator, the air gap 150 between the stator and the outer magnet surfaces 114 of the permanent magnets 111 facing the stator is to be selected larger than would be necessary without the bandage 140. This has a negative effect on the power density of the electrical machine 100.

The bandage arrangement 140 presented here addresses this problem in that for fixing each permanent magnet 111 of a respective permanent magnet group 111-1, 111-2 to the surface 113 of the rotor 110, the bandage arrangement 140 has retaining regions 145 that are to be positioned in corresponding recesses or grooves 115 in the outer magnet surfaces 114 of the permanent magnets 111, 111 but not on the free surface regions 114f of the magnet surfaces 114 lying outside the grooves 115.

Figure 3:
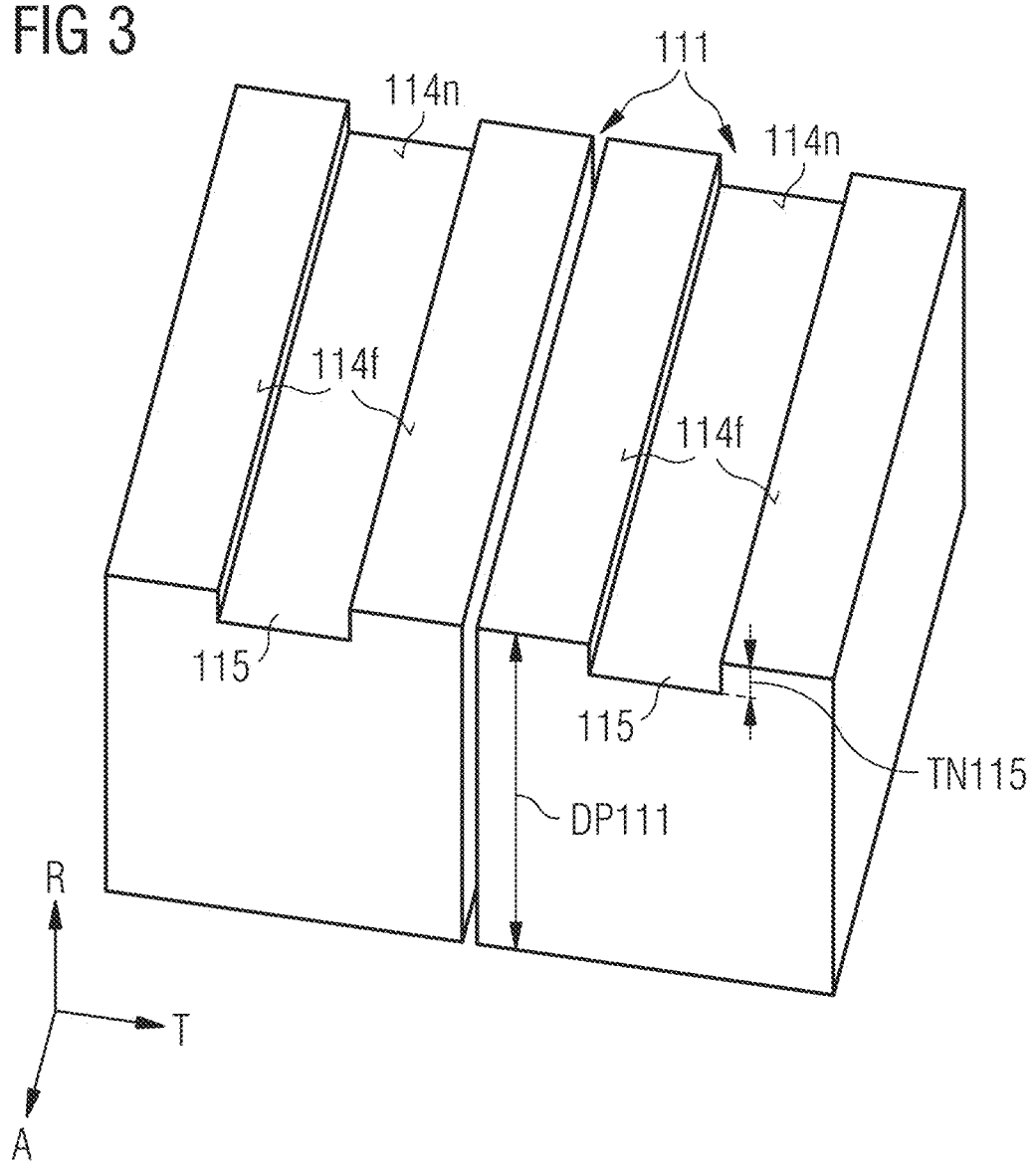
FIG. 3 shows two permanent magnets in the first embodiment.

FIG. 3 shows representatively two adjacent permanent magnets 111 of one of the two permanent magnet groups 111-1, 111-2. The grooves 115 that run between axial ends of the respective permanent magnets 111 are formed by radial recesses in the magnet surfaces 114 of the respective permanent magnet 111. In this way, the respective magnet surface 114 is divided into a groove surface region 114n that contains the groove 115, and a free surface region 114f, where the groove surface region 114n is offset relative to the free surface region 114f in the radial direction by a distance TN115 that corresponds to the depth TN115 of the groove 115. In FIG. 2, the groove surface regions 114n of the permanent magnets 111 are not visible because the groove surface regions 114n are concealed by the bandage arrangement 140 and, for example, by the retaining regions 145 each positioned in the grooves 115. The areas marked with reference sign 114 in FIG. 2 thus practically correspond to the free surface regions 114f of the respective permanent magnet 111.

In FIG. 3, the grooves 115 run in the axial direction A. In principle, it would also be conceivable for the grooves 115 to not run precisely in the axial direction A, but at an angle a with respect to the axial direction A of 0°<a<90° (FIG. 3 shows the simplest and also the most effective case of a=0°).

Figure 4:
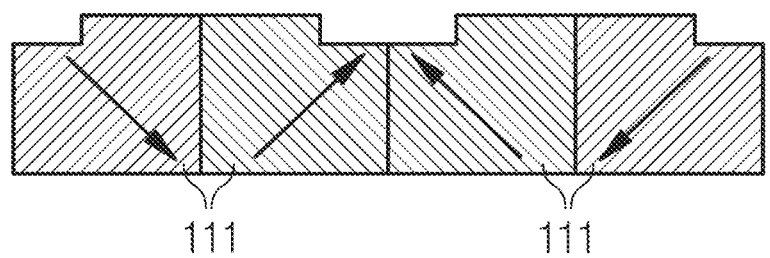
FIG. 4 is an axial view of some permanent magnets to illustrate positioning of a groove.

FIG. 4 shows an axial view of some of the permanent magnets 111, where the arrows depicted there indicate the magnetization and hence the poles of the permanent magnets 111. The grooves 115 are positioned such that the grooves 115 each lie precisely on a magnetic pole and not between two poles. Thus, for the same torque, the normal force is reduced by around 10%, which counters the structural design. This design is naturally applicable, for example, in the embodiment with axial grooves 115.

Figure 5:
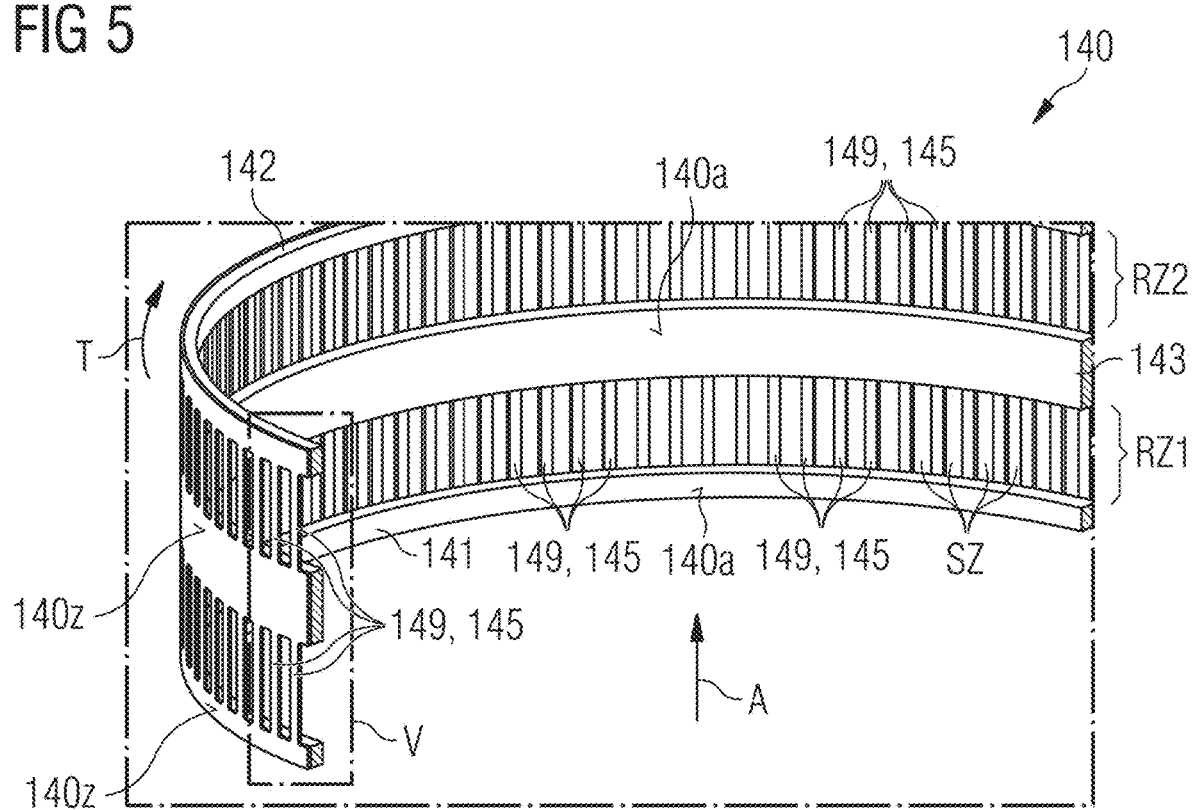
FIG. 5 shows the bandage arrangement in the first embodiment.

FIG. 5 shows the first embodiment of the bandage arrangement 140 containing the retaining regions 145 that are to be positioned in the grooves 115 in order to fix the magnets 111 to the rotor 110. The bandage arrangement 140 includes a ring group with, in the case shown, a first ring 141, a second ring 142, and a third ring 143 arranged in the axial direction A between the first ring 141 and the second ring 142. The rings 141, 142, 143 are coaxial to one another and arranged behind one another in the axial direction A and hence spaced apart from one another, so that a ring intermediate space RZ1, RZ2 exists between each two mutually adjacent rings 141, 142, 143 of the ring group. Further, the bandage arrangement 140 includes a web group with a plurality of webs 149. Each web 149 of the web group runs between two adjacent rings 141, 143 or 143, 142 of the ring group. A number of webs 149 of the web group run between two adjacent rings 141, 143 or 143, 142 of the ring group, so that in each case two adjacent rings 141, 143 or 143, 142 of the ring group are connected together by a number of webs 149 of the web group. For the sake of clarity, only some webs 149 carry reference signs in FIG. 3 and in the other figures.

The number of webs 149 that run between two adjacent rings 141, 143 or 143, 142 of the ring group are arranged at typically regular intervals behind one another viewed in the tangential direction T, and hence distributed around the periphery of the bandage arrangement 140, so that an empty web intermediate space SZ is present between each two such adjacent webs 149. Consequently, the web intermediate spaces SZ thus lie in the ring intermediate spaces RZ1 or RZ2.

Figure 6:
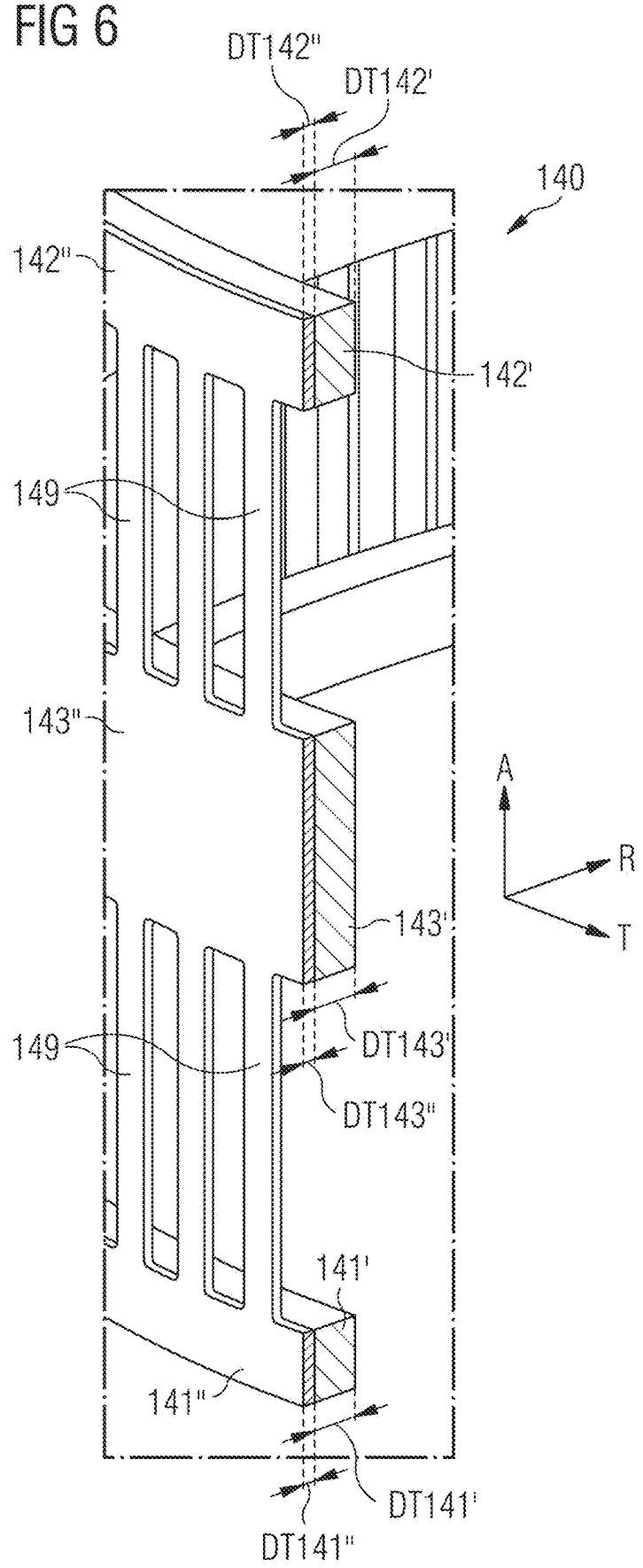
FIG. 6 is a detail view of the bandage arrangement in the first embodiment.

Further, at least the rings 141, 142 of the ring group on the outside viewed in the axial direction A (e.g., as shown accordingly in FIG. 5, each ring 141, 142, 143 of the ring group) may, but need not, each include at least one radially inner partial ring portion 141', 142', or 143' with radial extents or thicknesses DT141', DT142' or DT143', and a radially outer partial ring portion 141", 142", 143" with thicknesses DT141", DT142", DT143". Consequently, DR141=DT141'+DT141", DR142=DT142'+DT142", or DR143=DT143'+DT143", where DR141, DR142, and DR143 designate the radial extents or thicknesses of the rings 141, 142, 143. This is shown in FIG. 6, which depicts the portion marked "V" in FIG. 5.

In the rings 141, 142, 143 of the ring group that have a radially inner partial ring portion 141', 142', 143' and a radially outer partial ring portion 141", 142", 143", in each case, the radially inner partial ring portion 141', 142', 143' is arranged radially inside the radially outer partial ring portion 141", 142", 143". The partial rings 141' and 141" or 142' and 142" or 143' and 143" belonging to a respective ring 141, 142, 143 may lie against one another and thus finally form an integral component (e.g., the respective ring 141, 142, 143 of the ring group). For the sake of clarity, the term "comprise" also includes the situation in which the rings 141, 142, 143 concerned are integral (e.g., the respective inner partial ring portions 141', 142', 143' and outer partial ring portions 141", 142", 143" form an integral unitary component 141, 142, 143). Similarly, this covers the situation in which the rings 141, 142, 143 concerned are each composed of two separate partial rings 141' and 141" or 142' and 142" or 143' and 143" (e.g., the inner partial ring portion 141', 142', 143' is glued to the associated outer partial ring portion 141", 142", 143"). Suitable materials may, for example, be non-conductive materials (e.g., glass-fibre reinforced plastic (GRP)).

The bandage arrangement 140 is, for example, configured such that a surface 140z of the bandage arrangement 140 facing the stator 120, apart from the intermediate spaces SZ or RZ1, RZ2, is a smooth surface substantially corresponding to a cylinder casing. In other words, adjacent rings 141, 142, 143 and webs 149 of the bandage arrangement 140 lie flush on the surface 140z. In contrast, in the embodiment shown, the surface 140a facing away from the stator 120 is not smooth, since, for example, the inner partial ring portions 141', 142', 143' protrude beyond the inner surfaces 140a of the webs 149 in the radial direction pointing away from the stator 120 and facing the rotor main body 112.

Again with reference to FIG. 2, it is evident that the bandage arrangement 140 structured in this way is arranged on the rotor 110 such that one of the permanent magnet groups 111-1 or 111-2 is situated between each two mutually adjacent rings 141, 143 or 143, 142 of the ring group (e.g., the respective permanent magnet group 111-1 or 111-2 lies in the corresponding intermediate space RZ1 or RZ2). For the case (not shown) in which the rotor has, for example, only a single permanent magnet group, the bandage arrangement may include only two rings with webs extending in-between, where the single permanent magnet group may be arranged between the rings.

The bandage arrangement 140 is arranged such that the rings 141, 142, 143 and the permanent magnet groups 111-1, 111-2 alternate viewed in the axial direction, so that in each case one of the rings 141, 142, 143 lies between and in front of or behind the permanent magnet groups 111-1, 111-2. The third ring 143 is positioned behind the permanent magnet groups 111-1, 111-2. Further, the bandage arrangement 140 is arranged with respect to the rotor 110 such that the webs 149 of the web group fix the permanent magnets 111 to the surface 113 (e.g., the webs of the web group each form a retaining region 145 of the bandage arrangement 140). For this, because of the arrangement of the bandage arrangement 140 with respect to the permanent magnets 111, the webs 149, for example, are positioned in a respective groove 115 and above the corresponding groove surface region 114n of a respective permanent magnet 111 of the respective permanent magnet group 111-1, 111-2. The free surface regions 114f, however, lie in corresponding web intermediate spaces SZ. Since the rings 141, 142, 143 do not themselves lie in grooves 115 or similar, but finally between the permanent magnet groups 111-1, 111-2 and corresponding magnets 111, the rings 141, 142, 143 do not form retaining regions 145.

The webs 149 each have a thickness or radial extent DS149 that may correspond substantially to the depth TN115 of the grooves 115 (e.g., DS149=TN115). Since the thickness DS149 of the webs 149 corresponds to the groove depth TN115 and the webs 149 are positioned in the grooves 115, the free surfaces 114f of the permanent magnets 111 and the outer surfaces 140z of the webs 149 lie flush with one another. The selection TN115=DS149 constitutes an optimum, as this provides that the webs 149 have a sufficient thickness DS149 to offer the necessary retaining force and stability of the bandage arrangement 140. The webs 149 are also simultaneously thin enough not to protrude beyond the magnet surfaces 114 or 114f in the radial direction R, so that, consequently, the air gap 150 may be configured without having to take account of the thickness of the bandage arrangement 140.

The bandage arrangement 140 is thus configured and dimensioned, and, for example, arranged with respect to the permanent magnet groups 111-1, 111-2 on the rotor 110, so as to give a surface composed of the outer surface 140z and the free magnet surfaces 114f that is largely smooth and corresponds to the outer surface of a cylinder casing (e.g., apart from the unavoidable gaps between the bandage arrangement 140 and the magnets 111 at the points at which the free surfaces 114f of the magnets 111 lie in the web intermediate spaces SZ). In other words, the free magnet surfaces 114f and the outer surface 140z of the bandage arrangement 140 are flush with one another when the bandage arrangement 140 is installed in the rotor 110.

To create such a bandage arrangement 140, for example, a flat sheet of suitable material may be used, from which portions may be punched so as to give the described arrangement 140 with the intermediate spaces SZ, RZ1, RZ2. Suitable materials would be non-conductive or at least only poorly conductive (e.g., GRP, carbon-fibre reinforced plastic (CFRP), or in some cases, titanium).

In each case, the outer partial ring portions 141", 142", 143" may be integral parts of the flat sheet itself, so that the thickness DS149 of the webs 149 and the thicknesses DT141", DT142", DT143" of the outer partial ring portions 141", 142", 143" effectively correspond automatically. Thus, the webs 149 and the outer partial ring portions 141", 142", 143" would constitute an integral component. The respective inner partial ring portion 141', 142', 143' may then, for example, be a further ring 141', 142', 143' that is attached to the respective outer ring portion 141", 142", 143", and thus extends away from the sheet in the radial direction R corresponding to a corresponding radial thickness DT141', DT142', DT143'.

The radial extents or thicknesses DR141, DR142, DR143 of the rings 141, 142, 143 need not necessarily correspond to the thicknesses DS149 of the webs 149, but are larger than these. For example, it is suitable if the thicknesses DR141, DR142, DR143 correspond to the thicknesses DP111 of the magnets 111. This may be provided for the above-described embodiment in which the webs 149 and the outer partial ring portions 141", 142", 143" are integral parts of the flat punched sheet. In the axial direction A, the outer partial ring portions 141", 142", 143" protrude beyond the permanent magnets 111. Since the bandage arrangement 140 in installed state stands under substantial mechanical tension in order to fix the permanent magnets 111, damage may occur to the magnets 111 at axial ends of the magnets 111. This is due to the axially protruding regions 141", 142", 143" of the bandage arrangement 140 being bent towards the surface 113 of the rotor 110 because of the mechanical stress and thus, for example, exerting a force on the ends that may lead to damage of the magnets 111. This may be prevented if the axially protruding regions 141", 142", 143" of the bandage arrangement 140 are supported radially. This function is performed by the inner partial ring portions 141', 142', 143' if the inner partial ring portions 141', 142', 143' have corresponding thickness (e.g., the inner partial ring portions 141', 142' 143' act as supports between the outer partial ring portions 141", 142", 143" and the surface 113). In concrete terms, this provides that DP111=DR141=DR142=DR143. If DT141"=DT142"=DT143"=TN115, then automatically the thicknesses of the inner partial ring portions are to be DT141'=DT142'=DT143'=DP111-TN115.

Thus, in the described embodiment of the bandage arrangement 140, at least the webs 149 and the outer partial ring portions 141", 142", 143" form an integral component. The inner partial ring portions 141', 142' 143' may in some cases also be integral parts of the one-piece component, which may then be produced, for example, by an additive manufacturing method. Alternatively, the inner partial ring portions 141', 142', 143' may be provided as separate components that are attached to the component 149, 141", 142", 143" that may be made as one piece.

Figure 7:
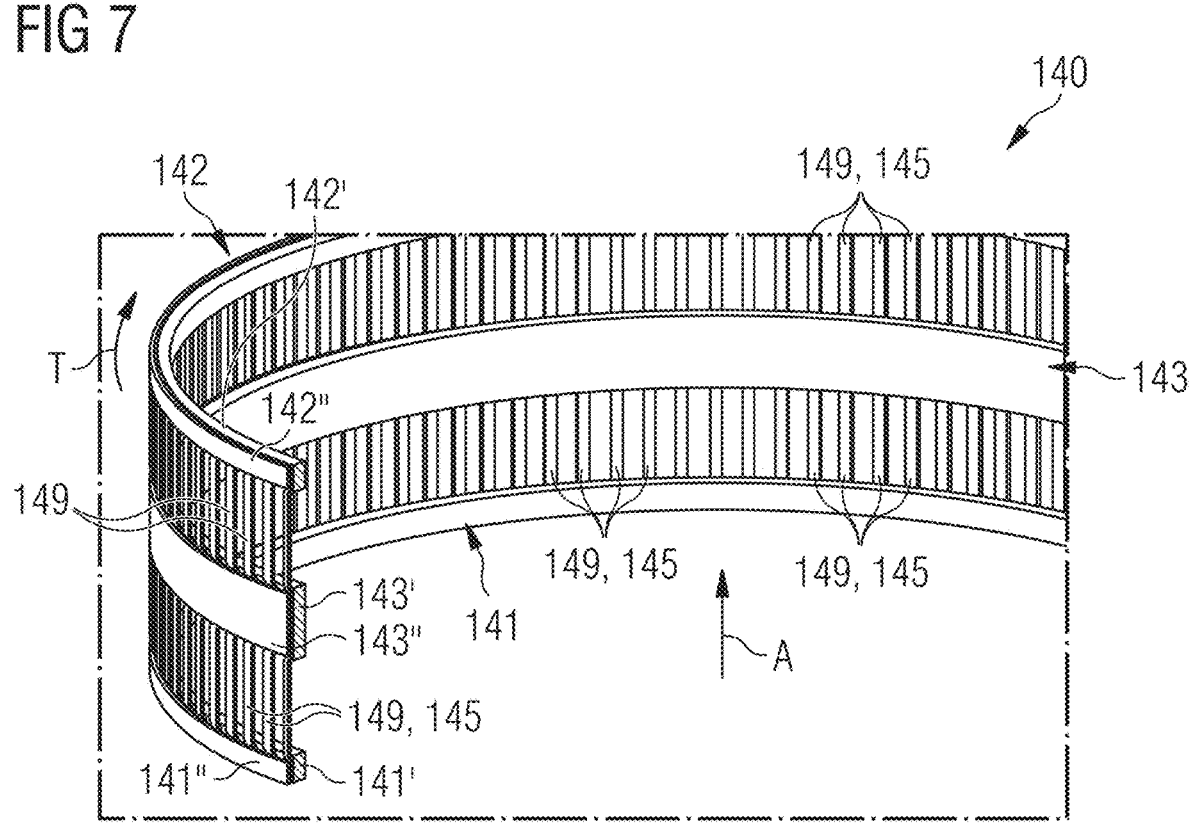
FIG. 7 shows the bandage arrangement in a variant of the first embodiment.
Figure 8:
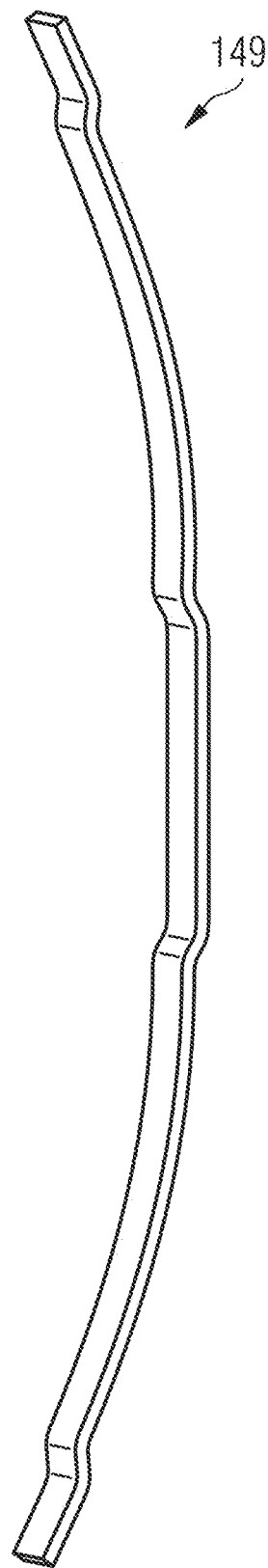
FIG. 8 shows a web of the bandage arrangement in uninstalled state.
Figure 9:
FIG. 9 shows the web of the bandage arrangement in installed state.

In an alternative configuration that is explained in conjunction with FIGS. 7-9, the webs 149 and the outer partial ring portions 141", 142", 143" do not form an integral component but are provided as separate components. The inner partial ring portions 141', 142', 143' are also separate components that are to be joined to the webs 149 and the outer partial ring portions 141", 142", 143" in order to form the bandage arrangement 140. In assembled state, this bandage arrangement 140 corresponds to the bandage arrangement already described. The webs 149 that are shown in more detail in FIGS. 8 and 9 may, for example, be formed or bent such that the webs 149 have a pretension in the state shown in FIG. 8, in which the webs 149 are not yet installed on the bandage arrangement 140. FIG. 9 then shows the resulting form of the webs 149 when installed in the bandage arrangement 140. Because the axial ends of the webs in this state are pressed by the outer partial ring portions 141", 142", 143" inward in the radial direction R against the inner partial ring portions 141', 142', 143', the webs 149 are no longer bent but largely straight or flat. This provides that a more even pressure is exerted on the permanent magnets 111.

The function of the bandage arrangement 140 formed in this way, dimensions of the bandage arrangement 140, and positioning of the bandage arrangement 140 on the rotor 110 correspond to those of the bandage arrangement 140 already described.

Figure 10:
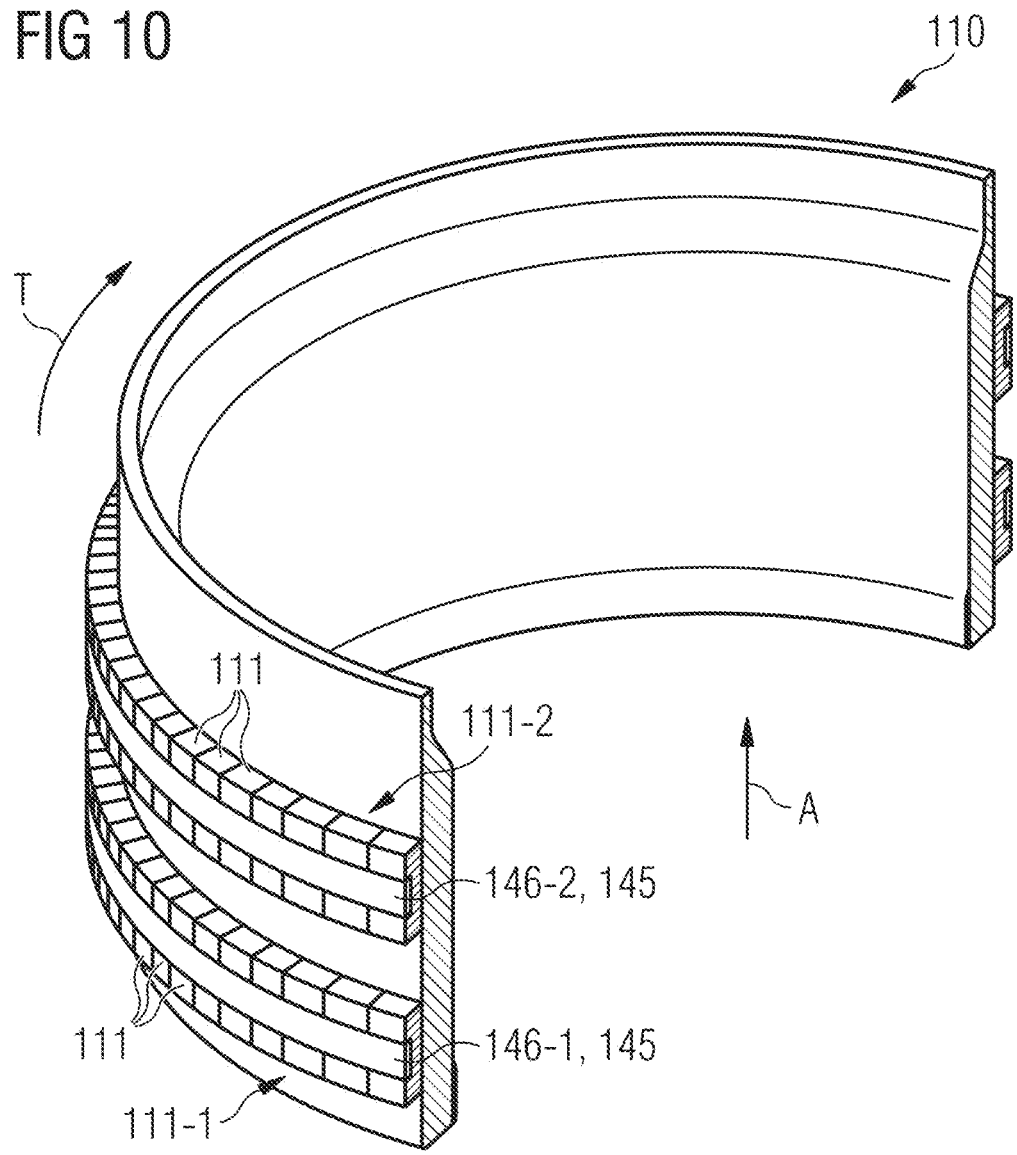
FIG. 10 shows the rotor with the bandage arrangement in a second embodiment.
Figure 11:
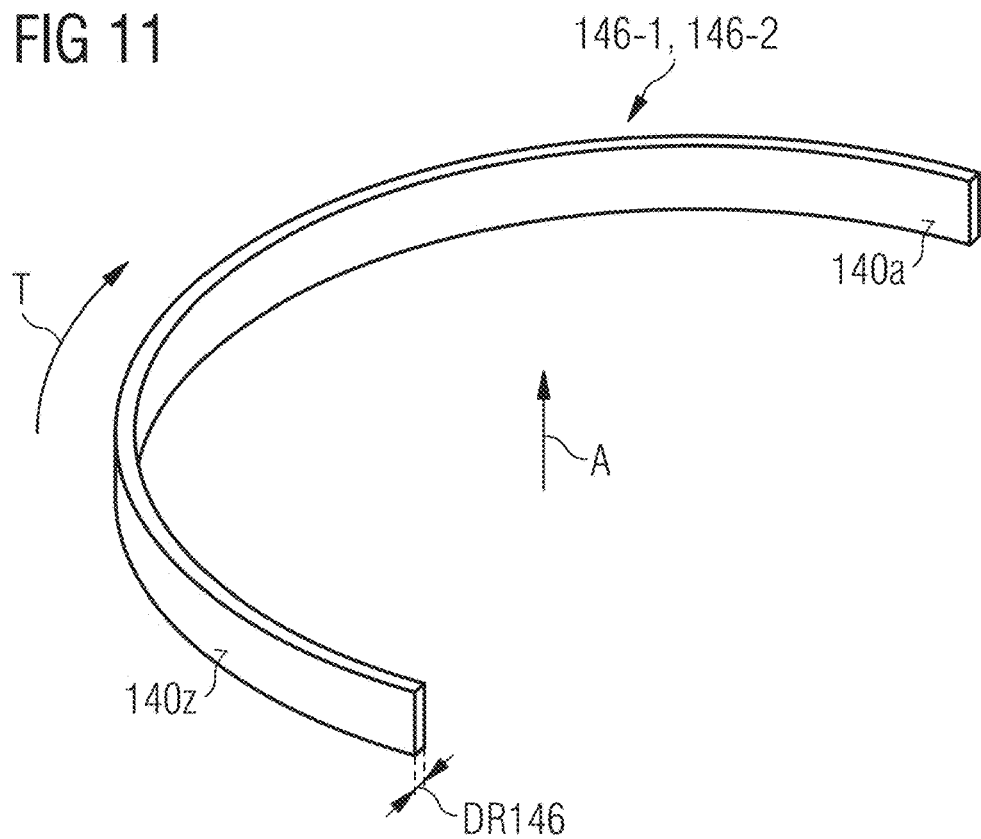
FIG. 11 shows the bandage arrangement in the second embodiment.

FIG. 10 shows a rotor 110 with a bandage arrangement 140 according to a second embodiment, in which the bandage arrangement 140 is implemented using solely one or in some cases a number of flat rings 146-1, 146-2. In contrast to the embodiment described above, this configuration omits the axial connections designated "webs" 149 that are positioned in the corresponding axial grooves 115 of the permanent magnets 111. The number of flat rings 146-1, 146-2 depends on the number of permanent magnet groups 111-1, 111-2. At least one such ring 146-1, 146-2 is provided for each group 111-1, 111-2. As an example, the description below is based on two groups 111-1, 111-2. Accordingly, the bandage arrangement 140 includes two rings 146-1, 146-2. FIG. 11 shows how these rings 146-1, 146-2 may be formed.

Figure 12:
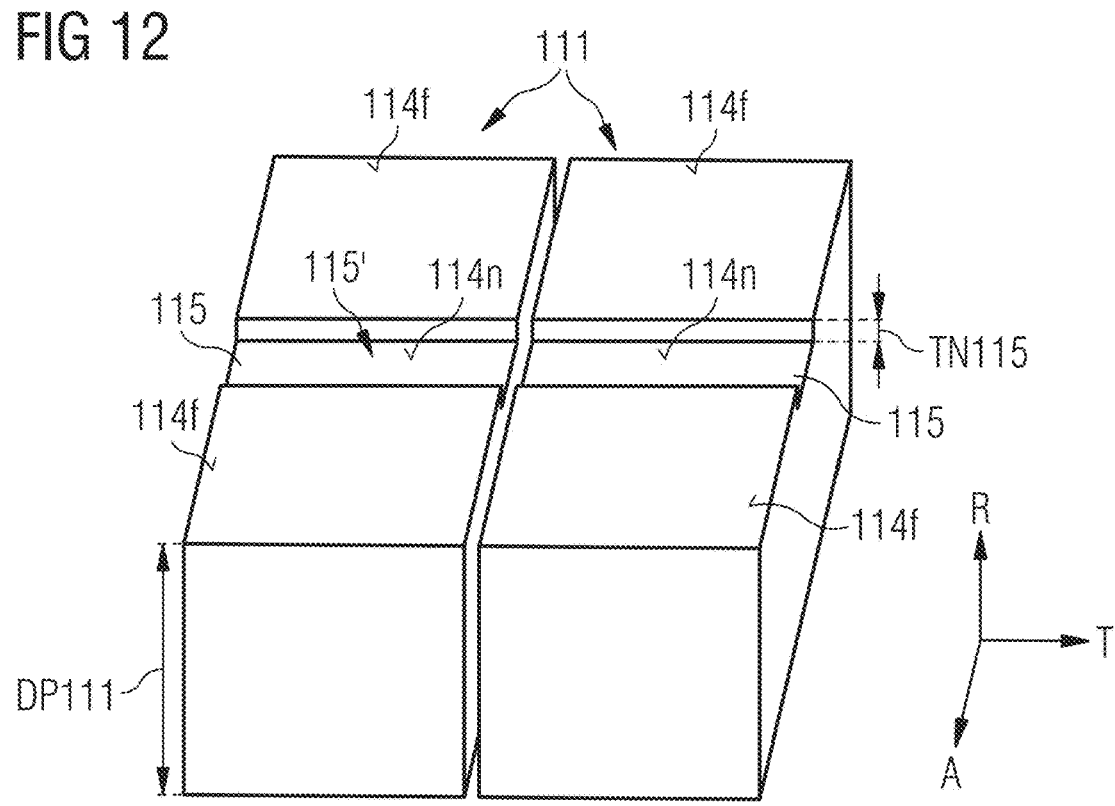
FIG. 12 shows two permanent magnets in the second embodiment.

In principle, similar to the first embodiment, the permanent magnets 111 in the second embodiment also have grooves 115 in which the rings 146-1, 146-2 of the bandage arrangement 140 are positioned in order to fix the magnets 111. In contrast to the axial orientation of the grooves 115 in the first embodiment, the grooves 115 in the second embodiment are oriented tangentially. This is shown in FIG. 12, where FIG. 11 shows only two of the permanent magnets 111 of a group 111-1 or 111-2. Each of the permanent magnets 111 of a respective permanent magnet group 111-1, 111-2 accordingly has a tangential groove 115 in the magnet surface 114 facing the bandage arrangement 140, where the grooves 115 of the magnets 111 of a respective group 111-1, 111-2 are, for example, arranged and dimensioned such that the grooves 115 of adjacent permanent magnets 111 of the same group 111-1, 111-2 transform into or adjoin one another. The entirety of the mutually adjoining grooves 115 of a respective group 111-1, 111-2 thus form a respective continuous peripheral groove 115' in the tangential direction T. The peripheral groove 115', like the individual grooves 115, has a depth TN115.

Each of the rings 146-1, 146-2 is positioned in a respective groove 115', where the rings 146-1, 146-2 each have a radial extent or thickness DR146 that corresponds to the groove depth TN115 (e.g., DR146=TN115). This again provides that the free surfaces 114f of the magnets 111 and the outer surfaces 140z of the rings 146-1 or 146-2 of the bandage arrangement 140 are flush with one another so that the air gap 150 may be minimized.

Since the rings 146-1, 146-2 are each positioned as a whole in the respective peripheral groove 115, the entire ring 146-1, 146-2 constitutes a retaining region 145. Consequently, the bandage arrangement 140 in this case has no regions that function as a retaining region 145.

In the figures, for the sake of clarity, in some cases, only a few components carry reference signs. This applies, for example, to the magnet surfaces 114, the permanent magnets 111, and the webs 149.

Purely for clarity, the objects depicted, for example, in FIGS. 2, 5, 7, 10, and 11 are substantially circular ring-shaped, although only a portion of the circular ring is depicted in the figures.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A rotor for an electrical machine, the rotor comprising:
    at least one permanent magnet group, wherein each permanent magnet group of the at least one permanent magnet group comprises at least one permanent magnet;
    a bandage arrangement with at least one retaining region for fixing each permanent magnet to a surface of the rotor,
    wherein each permanent magnet has a groove in a groove surface region of an outer magnet surface of the respective permanent magnet facing the bandage arrangement, the respective permanent magnet having a first side and a second side opposite the first side,
    wherein the outer magnet surface has a free surface region, the groove surface region being offset relative to the free surface region,
    wherein a first portion of the free surface region is between the first side of the respective permanent magnet and the groove, and a second portion of the free surface region is between the second side of the respective permanent magnet and the groove, wherein the bandage arrangement is dimensioned and configured, and arranged with respect to each permanent magnet of the respective permanent magnet group, such that at least the respective retaining region of the bandage arrangement is positioned in a respective groove of a respective permanent magnet of the respective permanent magnet group, and wherein the respective retaining region of the bandage arrangement is at least as thin as a depth of the respective groove.

2. The rotor of claim 1, wherein for a surface of the bandage arrangement facing away from the rotor, at least in retaining regions of the at least one retaining region with free surface regions lying outside the respective groove surface region of the outer magnet surface of the respective permanent magnet, forms a substantially smooth cylinder surface.

3. The rotor of claim 1, wherein the bandage arrangement has a thickness that corresponds to a depth of the respective groove in which the respective retaining region is positioned.

4. The rotor claim 3, wherein the bandage arrangement has the thickness in the respective retaining region positioned in a respective groove.

5. The rotor of claim 1, wherein each permanent magnet group of the at least one permanent magnet group has a plurality of permanent magnets, wherein the plurality of permanent magnets of the respective permanent magnet group, viewed in a tangential direction, are positioned one behind the other on the surface of the rotor so as to form a respective magnet ring, and wherein the grooves of the plurality of permanent magnets of the respective permanent magnet group are configured in the respective outer magnet surface, such that the grooves of adjacent permanent magnets of the respective permanent magnet group adjoin one another such that the mutually adjoining grooves form a peripheral groove in the tangential direction of the respective permanent magnet group.

6. The rotor of claim 5, wherein the bandage arrangement for a respective permanent magnet group of the at least one permanent magnet group in each case comprises, as a retaining region, a bandage component configured as a substantially flat circular ring, and wherein a respective bandage component of the bandage arrangement is positioned in a respective peripheral groove of a respective permanent magnet group.

7. The rotor of claim 1, wherein the bandage arrangement comprises:

a ring group with at least a first ring and a second ring, wherein the first ring and the second ring of the ring group are arranged behind one another in an axial direction, so that there is a ring intermediate space between each two mutually adjacent rings of the ring group, a web group with a plurality of webs, wherein each web of the plurality of webs of the web group runs between two adjacent rings of the ring group, and wherein a number of webs of the plurality of webs of the web group run between each two adjacent rings of the ring group.

8. The rotor of claim 7, wherein the bandage arrangement is arranged on the rotor such that one permanent magnet group of the at least one permanent magnet group is arranged between each two mutually adjacent rings of the ring group, and wherein each of at least some webs of the plurality of webs of the web group, at least some rings of the ring group, or the webs and the rings forms a retaining region of the bandage arrangement.

9. The rotor of claim 7, wherein for each permanent magnet, the respective groove runs between two axial ends of the respective permanent magnet.

10. The rotor of claim 9, wherein the respective groove is positioned such that the respective groove lies on a magnetic pole of the respective permanent magnet.

11. The rotor of claim 7, wherein the number of webs running between two adjacent rings of the ring group are arranged one behind the other viewed in a tangential direction, so that there is a web intermediate space between each two adjacent webs of the number of webs, wherein the plurality of webs of the web group, the rings of the ring group, or the plurality of webs of the web group and the rings of the ring group that form a retaining region of the bandage arrangement are dimensioned, and the bandage arrangement is arranged with respect to the respective permanent magnet group, such that a free surface region of the outer magnet surface lying outside the groove surface region is positioned in one of the web intermediate spaces.

12. The rotor of claim 7, wherein at least rings of the ring group that lie on the outside viewed in the axial direction each have at least one radially inner partial ring portion and at least one radially outer partial ring portion, wherein for the rings of the ring group that consist of a radially inner and a radially outer partial ring portion:
a thickness of one of the respective partial ring portions corresponds to a thickness of the webs; and
a total thickness of the respective ring is greater than the thickness of the webs.

13. The rotor of claim 7, wherein the webs of the web group and the rings of the ring group each constitute separate components, and wherein the individual webs and the individual rings are joined together, such that the bandage arrangement is constructed.

14. The rotor of claim 13, wherein the webs are bent in a state not installed in the bandage arrangement, and the webs are substantially flat in a state installed in the bandage arrangement.

15. The rotor of claim 1, wherein the thickness of the respective retaining region of the bandage arrangement is equal to a depth of the respective groove.

* * * * *